United States Patent Office 3,200,143
Patented Aug. 10, 1965

3,200,143
QUATERNARY AMMONIUM COMPOUNDS
Frederick Charles Copp, London, England, assignor to Burroughs Wellcome & Co. (U.S.A.) Inc., Tuckahoe, N.Y., a corporation of New York
No Drawing. Filed Nov. 10, 1959, Ser. No. 851,941
Claims priority, application Great Britain, Jan. 24, 1957, 2,595/57; Feb. 13, 1959, 5,154/59, 5,155/59
5 Claims. (Cl. 260—501)

The present invention relates to quaternary ammonium compounds, and the preparation thereof, and is a continuation-in-part of the invention described and claimed in copending application No. 647,487, now U.S. Patent No. 2,918,401.

In the specifications of that application there is claimed a process for the treatment of nematode infestations which comprises the administration to the host of the nematode infested locus of a quaternary ammonium salt of the general Formula I:

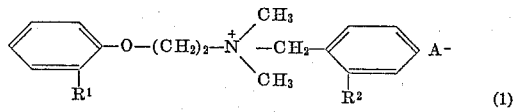

wherein $R^1$ is hydrogen, chlorine, bromine or a methyl or nitro group;
$R^2$ is hydrogen, chlorine, bromine, fluorine or a methyl group; and
$A^-$ is the anion equivalent of a non-toxic acid.

The compounds of Formula I effectively decrease the infestations of nematodes closely associated with the mucosa of the gastro-intestinal tract in test animals and in animals of economic importance. In particular the compounds of Formula I are effective against *Nippostrongylus muris* in rats and *Nematospiroides dubius* and *Aspiculuris tetraptera* in mice. Various members of the series are also effective against *Nematodirus* spp., *Ostertagia circumcincta*, *O. trifurcata*, *Cooperia curticei* and *Trichostrongylus axei* in sheep, *Ancylostoma canium* in dogs and cats, and *A. duodenale* and *Necator americanus* in man.

It has been found that the toxic effects of compounds of Formula I upon the host are much reduced whilst the anthelmintic properties are retained, when the cation defined in Formula I is administered as the salt of an acid so selected that the salt has a solubility in water of less than 1.0% w./v. at 20° C.

Particularly useful salts are those of embonic acid and 2-hydroxy-3-naphthoic acid. Other useful salts are those of laurylsulphuric, P-bromobenzenesulphonic, P-chlorobenzenesulphonic, dodecylbenzenesulphonic diphenyl-1-sulphonic, naphthalene-1-sulphonic, naphthalene-2-sulphonic, naphthalene-1:5-disulphonic, naphthalene-2:7-disulphonic, 1-naphthol-3:6-disulphonic, 2-naphthol-3:6-disulphonic, 1-naphthoic, 2-naphthoic, 4:4'-diehydroxydiphenylmethane-3:3'-dicarboxylic, piperazine-1:4-bis(carbodithioic), ˉP-acylamidobenzenesulphonic, N-acylamido, 4:4'-diaminostilbene, 2:2'-disulphonic and perchloric acids.

The present invention in one aspect, therefore, provides quaternary ammonium salts containing the cation defined in Formula I and an anion equivalent of a therapeutically acceptable acid so selected that the salt has a solubility in water of less than 1.0% at w./v. at 20° C.

The present invention in another aspect provides quaternary ammonium salts containing the cation defined in Formula I and an anion equivalent of a therapeutically acceptable organic acid so selected that the salt has a solubility in water of less than 1.0% w./v. at 20° C.

The present invention in yet another aspect provides the perchlorates of the cation defined in Formula I.

In Table I, the solubility in water at 20° C. of some of the salts of the N-benzyl-N:N-dimethyl-N-2-phenoxyethylammonium cation is given:

TABLE I

| Anion: | Solubility, percent w./v. at 20° C. |
|---|---|
| (1) Chloride | Freely soluble. |
| (2) Bromide | Freely soluble. |
| (3) Citrate | Freely soluble. |
| (4) Methylsulphate | Freely soluble. |
| (5) Piperazine-1:4-bis(carbodithioate) | 0.7. |
| (6) Naphthalene-2-sulphonate | 0.6. |
| (7) Laurylsulphate | 0.3. |
| (8) Naphthalene-1-sulphonate | 0.3. |
| (9) Perchlorate | 0.2. |
| (10) p-Chlorobenzenesulphonate | 0.2. |
| (11) Naphthalene-1:5-disulphonate | 0.2. |
| (12) Dodecylbenzenesulphonate | 0.16. |
| (13) 1-naphthoate | 0.06. |
| (14) 2-hydroxy-3-naphthoate | 0.05. |
| (15) Embonate | 0.03. |

In Table II, the effectiveness of two salts of the N-benzyl-N:N-dimethyl - N-2 - phenoxyethylammonium cation against *Necator americanus* in man is given.

TABLE II

| Salt | Dosage (gm. of base) | Percentage Clearance |
|---|---|---|
| 1. Bromide | 2.25 | 40 |
| | 2.5 | 64 |
| | 1.25 | 36 |
| 2. 2-Hydroxy-3-naphthoate | 2.25 | 90 |
| | 2.5 | 97 |
| | 3.0 | 100 |
| | 4.0 | 72 |

The percentage clearance of the worms was calculated from the number of eggs per gram in the faeces immediately before and four days after administration of the salt. The bromide was administered in tablets or capsules; nausea and vomiting were the toxic side-effects. The hydroxynaphthoate was administered in tablets or suspensions, with no toxic side-effects. The difference in effectiveness between the bromide and hydroxynaphthoate was probably due to the more rapid removal of the bromide by absorption or vomition or both from the gastro-intestinal tract.

In Table III, the acute toxicity of three salts of the N-benzyl - N:N - dimethyl-N-2-phenoxyethylammonium cation to mice is given; the figures represent the amount of salt in mg./kg. body weight which when given as a single dose killed approximately 50% of the animals in a group (that is, the approximate $LD_{50}$).

TABLE III
MICE

Salt:
(1) Chloride _____ 800
(2) 2-hydroxy-3-naphthoate _____ 2,000
(3) Embonate _____ >10,000

Comparable differences are found for the acute toxicities of these three salts in dogs and sheep; in these two animals, however, the acute toxic dose for each salt varies according to the mode of administration and the period which has elapsed since the animal's last meal. When the chloride is administered, dogs tend to vomit, sheep to scour.

In Table IV, the chronic toxicity due to the daily administration of three salts of the N-benzyl-N:N-dimethyl-N-2-phenoxyethylammonium cation in mg./kg. body weight to dogs and monkeys is given.

TABLE IV

| Salt | Dog | | Monkey | |
|---|---|---|---|---|
| | Dose | Effect | Dose | Effect |
| 1. Chloride | 150 | Died after 10 days. | 317 | Died after 16 days. |
| 2. 2-Hydroxy-3-naphthoate | 200 | Killed after 197 days. | 500 | Killed after 183 days. |
| 3. Embonate | 200 | ......do....... | 500 | Died after 119 days. |

It is to be noted that the choice of anion is influenced to some extent by the nature of the host and of the nematode parasite. For example, N-benzyl-N:N-dimethyl-N-2-phenoxyethylammonium embonate is less toxic than the 2-hydroxy-3-naphthoate to sheep, which have an extensive and complicated digestive tract; the embonate is slightly more toxic than the 2-hydroxy-3-naphthoate to monkeys.

The salts of the present invention are conveniently prepared by double decomposition, for example in solution or on an ion-exchange column. For example, they may be prepared by reacting in aqueous solution a water-soluble salt of the cation of Formula I with a water-soluble salt of the appropriate acid, such as a sodium salt. The reagents are preferably used in equivalent proportions; the desired sparingly soluble salt is precipitated from solution and collected in the usual way.

Alternatively the salts of the present invention may be prepared by quaternisation; that is, by the reaction of an appropriate tertiary amine, containing all but one of the groups desired in the quaternary ammonium compound, with a derivative containing the group it is desired to introduce and an anion equivalent of the selected acid. It will be understood by those skilled in the art that this method is limited to the preparation of the salts in which the anion is sufficiently acidic, for example to the preparation of the sulphonates.

The salts may be administered in pharmaceutical preparations such as drafts, drenches, capsules, cachets, tablets or suspensions.

The invention will now be described in reference to the following examples in which all temperatures are given in degrees centigrade.

Example 1

A solution of disodium embonate (187 g.) in hot water (2 litres) was slowly added to a stirred solution of N-benzyl-N:N-dimethyl-N-2-phenoxyethylammonium chloride (253 g.) in cold water (800 ml.). At first a clear mixture was formed which rapidly deposited fine crystals as the addition proceeded. After the addition was completed, the mixture was stirred for a further 2 hours, the solid was filtered off, washed with fresh water (200 ml.) and dried in vacuo. The product, di-(N-benzyl-N:N-dimethyl-N-2-phenoxyethylammonium) embonate monohydrate, was a pale yellow solid, melting point 144–146°.

Example 2

1-dimethylamino-2-o-methylphenoxyethane (358 g.) was dissolved in acetone (1 litre) and benzyl chloride (278 g.) was slowly added with stirring. The mixture became warm and N-benzyl-N:N-dimethyl-N-2-(o-methylphenoxyethyl) ammonium chloride crystallised out. After 72 hours this salt was filtered off, washed with fresh acetone (200 ml.) and dried immediately in vacuo. It melted at 135–138°.

A solution of this chloride (300 g.) in cold water (1 litre) was stirred during the gradual addition of a solution of disodium embonate (212 g.) in hot water (2 litres). As described in Example 1, a solid separated as the addition proceeded. After standing for 2 hours, the solid was filtered off, washed with fresh water (400 ml.) and dried in vacuo. The product was di-[N-benzyl-N:N-dimethyl-N-(2-o-methylphenoxyethyl)] ammonium embonate, melting point 68–69°.

Example 3

A solution of sodium naphthalene-2-sulphonate (7.1 g.) in hot water (50 ml.) was slowly added to a solution of N-benzyl-N:N-dimethyl-N-2-phenoxyethylammonium chloride (9 g.) in water (50 ml.) with stirring. An oil separated and then crystallised. After the addition was complete, the mixture was stirred for 2 hours. The insoluble salt was then filtered off, washed with water and dried in vacuo. The resulting N-benzyl-N:N-dimethyl-N-2-phenoxyethylammonium naphthalene-2-sulphonate was a colourless solid. It was recrystallised from a mixture of ethanol and ether and melted at 137–139°.

Example 4

N-benzyl-N:N-dimethyl-N-2-phenoxyethylammonium naphthalene-1-sulphonate was prepared by the method described in Example 3 using sodium naphthalene-1-sulphonate. It was recrystallized from isopropanol and melted at 128–130°.

Example 5

2-hydroxy-3-naphthoic acid (1.88 g.) was dissolved in hot aqueous sodium hydroxide (0.5 N; 20 ml.) and the resulting solution was slowly added to a solution of N-benzyl-N:N-dimethyl-N-2-phenoxyethylammonium chloride (2.9 g.) in water (5 ml.). A gum separated at first but it solidified on scratching. After the addition was complete, the mixture was allowed to stand at room temperature for 2 hours and then filtered. The residue was washed with water and dried in vacuo to give N-benzyl-N:N-dimethyl-N-2-phenoxyethylammonium 2-hydroxy-3-naphthoate, melting point 170–171°.

Example 6

N-benzyl-N:N-dimethyl-N-2-phenoxyethylammonium 1-naphthoate was prepared by the method described in Example 5, using 1-naphthoic acid. It was recrystallised from ethanol and melted at 170.5–171.5°.

Example 7

N-benzyl-N:N-dimethyl-N-2-phenoxyethylammonium 2-naphthoate was prepared by the method described in Example 5 using 2-naphthoic acid. It was a gum sparingly soluble in water.

Example 8

Di-(N-benzyl-N:N-dimethyl-N-2-phenoxyethylammonium) 4:4′-dihydroxydiphenylmethane-3:3′-dicarboxylate was prepared by the method described in Example 5 using 4:4′-dihydroxydiphenylmethane-3:3′-dicarboxylic acid. It was a gum sparingly soluble in water.

Example 9

Di-(N-benzyl-N:N-dimethyl-N-2-phenoxyethylammonium) naphthalene-1:5-disulphonate was prepared by the method described in Example 3, using disodium naphthalene-1:5-disulphonate. It was recrystallised from ethanol and melted at 209–209.5°.

Example 10

Di-(N-benzyl-N:N-dimethyl-N-2-phenoxyethylammonium) naphthalene-2:7-disulphonate was prepared by the method described in Example 3, using disodium naphthalene-2:7-disulphonate. It was a gum sparingly soluble in water.

Example 11

Di-(N-benzyl-N:N-dimethyl-N-2-phenoxyethylammonium) 1-naphthol-3:6-disulphonate was prepared by the method described in Example 3, using disodium 1-naphthol-3:6-disulphonate. It was a gum sparingly soluble in water.

Example 12

Di-(N-benzyl-N:N-dimethyl-N-2-phenoxyethylammonium) 2-naphthol-3:6-disulphonate was prepared by the method described in Example 3, using disodium 2-naphthol-3:6-disulphonate. It was a gum sparingly soluble in water.

*Example 13*

N-benzyl - N:N-dimethyl-N-2-phenoxyethylammonium diphenyl-4-sulphonate was prepared by the method described in Example 3, using sodium diphenyl-4-sulphonate. It was a gum sparingly soluble in water.

*Example 14*

N-benzyl - N:N-dimethyl-N-2-(o-methylphenoxy)ethylammonium 2-hydroxy-3-naphthoate was prepared by the method described in Example 5, using N-benzyl-N:N-dimethyl - N-2-(o-methylphenoxy)ethylammonium chloride. It was a gum sparingly soluble in water.

*Example 15*

Equivalent quantities of 1-dimethylamino-2-phenoxyethane and o-chlorobenzyl chloride were reacted in acetone by the method of Example 2 to give N-o-chlorobenzyl-N:N-dimethyl-N-2-phenoxyethylammonium chloride monohydrate, melting point 65–66°.

This chloride was converted by the method of Example 1 into di-(N-o-chlorobenzyl-N:N-dimethyl-N-2-phenoxyethylammonium) embonate dihydrate, melting point 103–104°, solubility in water 0.07% w./v. at 20°.

*Example 16*

Di-(N-o-bromobenzyl - N:N - dimethyl-N-2-phenoxyethylammonium) embonate was prepared from N-o-bromobenzyl - N:N - dimethyl-N-2-phenoxyethylammonium bromide by the method of Example 1. It melted at 102–103°.

*Example 17*

Di-(N-benzyl - N:N - dimethyl-N-2-(o-nitrophenoxy) ammonium) embonate was prepared from N-benzyl-N:N-dimethyl - N - 2-(o-nitrophenoxy)ethylammonium chloride by the method of Example 1. It was a gum sparingly soluble in water.

*Example 18*

A solution of N-benzyl-N:N-dimethyl-N-2-phenoxyethyl-ammonium chloride (5.8 g.) in ethanol (10 ml.) was added to a solution of sodium (0.45 g.) in ethanol (25 ml.). The precipitated sodium chloride was removed by centrifuging. Piperazine hexahydrate (1.94 g.) was added and the mixture was shaken until a clear solution was formed. Carbon disulphide (2 g.) was then added slowly. A little flocculent solid was formed and was filtered off. Ether was added to the filtrate to give a gum which subsequently crystallised. After 24 hours this solid was filtered off, washed with ethyl acetate, ground up with acetone and filtered off again. The resulting residue was recrystallised by dissolution in cold methanol and slow addition of ether. Di-(N-benzyl-N:N-dimethyl-N-2-phenoxyethylammonium) piperazine-1:4 - bis(carbodithioate) monohydrate was obtained as cream coloured prisms, melting point 143–145°.

*Example 19*

A solution of sodium p-chlorobenzenesulphonate (4.29 g.) in hot water (40 ml.) was added slowly to a solution of N-benzyl-N:N-dimethyl-N-2-phenoxyethylammonium chloride (5.83 g.) in cold water (10 ml.) with stirring. A crystalline solid rapidly separated. After the addition was completed, the final mixture was stood overnight at 0°. The separated solid was filtered off, washed with fresh water and recrystallised from ethanol. N-benzyl - N:N - dimethyl-N-2-phenoxyethylammonium p-chlorobenzene-sulphonate, melting point 193–194°, resulted.

*Example 20*

A solution of N-benzyl-N:N-dimethyl-N-2-phenoxyethyl-ammonium chloride was prepared by the quaternisation of N:N-dimethyl-2-phenoxyethylamine (170 g.) with benzyl chloride (130 g.) in water (100 mls.) at 50°. When the reaction was complete the syrupy solution was diluted with water (800 mls.) and added with vigorous stirring to a solution of sodium dodecylbenzene sulphonate (360 g.) in water (3 litres). N-benzyl-N:N-dimethyl-N-2-phenoxyethylammonium dodecylbenzene sulphonate was precipitated as an oil. It was allowed to settle, was washed by successive suspension, settling and decantation, and was dried in vacuo.

*Example 21*

N-benzyl - N:N - dimethyl - N-2-phenoxyethylammonium lauryl sulphate was prepared by the method described in Example 20, using sodium lauryl sulphate (297 g.). It was obtained as an oil.

*Example 22*

A solution of N-benzyl-N:N-dimethyl-N-2-phenoxyethylammonium chloride (29.15 g.) in water (100 ml.) was added slowly to a solution of ammonium perchlorate (11.75 g.) in water (100 ml.). A crystalline solid separated during the course of addition. After standing at 0° for 1 hour the final mixture was filtered and the residue washed with water and dried in vacuo to give N-benzyl - N:N - dimethyl - N-2-phenoxyethylammonium perchlorate, melting point 123–124.5°.

In claim:

1. A quarternary ammonium salt of the general formula:

wherein $R^1$ is a radical selected from the class consisting of the methyl and nitro radicals, chlorine, bromine and hydrogen, and $R^2$ is a radical selected from the class consisting of the methyl radical, fluorine, chlorine, bromine and hydrogen, and $A^-$ is an anion equivalent of a therapeutically acceptable acid selected from the class consisting of embonic, naphthalene-1-sulphonic, naphthalene-2-sulphonic and 2-hydroxy-3-naphthoic acids.

2. A quaternary ammonium salt containing a cation as defined in claim 1 and an anion equivalent of embonic acid.

3. A quarternary ammonium salt containing a cation as defined in claim 1 and an anion equivalent of 2-hydroxy-3-naphthoic acid.

4. A quaternary ammonium salt containing a cation as defined in claim 1 and an anion equivalent of naphthalene-1-suphonic acid.

5. A quaternary ammonium salt containing a cation as defined in claim 1 and an anion equivalent of naphthalene-2-sulphonic acid.

References Cited by the Examiner

UNITED STATES PATENTS

| | | | |
|---|---|---|---|
| 2,336,465 | 12/43 | Buck et al. | 260—501 |
| 2,581,336 | 1/52 | Hartmann et al. | 260—501 |
| 2,743,210 | 4/56 | Jones | 167—30 |
| 2,887,509 | 5/59 | Nash | 260—501 |
| 2,899,459 | 8/59 | Fareri et al. | 260—501 |
| 2,909,457 | 10/59 | Birum | 167—30 |
| 2,918,401 | 12/59 | Copp | 260—501 |
| 2,976,319 | 5/61 | Rudner | 260—501 |

OTHER REFERENCES

Burrows: J. Parisitology, vol. 44, No. 6, 607–612 (1958).

LORRAINE A. WEINBERGER, *Primary Examiner.*

LEON ZITVER, *Examiner.*